United States Patent
Kuriki et al.

(10) Patent No.: US 8,442,530 B2
(45) Date of Patent: May 14, 2013

(54) MOBILE DEVICE HANDOVER SUPPORTING METHOD, RADIO NETWORK CONTROL DEVICE, RADIO BASE STATION AND COMPUTER PROGRAM

(75) Inventors: Koji Kuriki, Fukuoka (JP); Kazuyuki Naka, Fukuoka (JP); Hiroshi Ohiwane, Kawasaki (JP); Munenori Hatae, Fukuoka (JP); Yosuke Hori, Fukuoka (JP)

(73) Assignee: Fujitsu Limited, Kawasaki (JP)

(*) Notice: Subject to any disclaimer, the term of this patent is extended or adjusted under 35 U.S.C. 154(b) by 926 days.

(21) Appl. No.: 12/071,528

(22) Filed: Feb. 21, 2008

(65) Prior Publication Data

US 2009/0005045 A1 Jan. 1, 2009

(30) Foreign Application Priority Data

Feb. 23, 2007 (JP) .................... 2007-044261

(51) Int. Cl.
*H04W 36/00* (2009.01)

(52) U.S. Cl.
USPC ........... 455/436; 455/437; 455/432; 455/440; 455/63.1; 455/434; 455/161.1; 455/435.1; 455/438; 455/426.19

(58) Field of Classification Search ........... 455/437, 455/436, 432.1, 440, 63.1, 434, 161.1, 435.1, 455/438, 426.19, 426.1, 523, 389, 392; 370/332, 370/331, 395.4, 412, 328, 241, 342, 389, 370/392
See application file for complete search history.

(56) References Cited

U.S. PATENT DOCUMENTS

| 5,710,974 | A | * | 1/1998 | Granlund et al. ............. 455/436 |
| 5,970,408 | A | * | 10/1999 | Carlsson et al. .............. 455/439 |
| 6,195,342 | B1 | * | 2/2001 | Rohani .......................... 370/331 |
| 6,243,575 | B1 | | 6/2001 | Ohyama et al. |
| 6,393,282 | B1 | * | 5/2002 | Iimori .......................... 455/432.1 |
| 6,826,161 | B1 | * | 11/2004 | Shahidi et al. ................ 370/331 |
| 7,215,956 | B2 | * | 5/2007 | Liu et al. ....................... 455/434 |
| 7,376,423 | B2 | * | 5/2008 | Sakanaba .................... 455/435.1 |
| 2003/0053427 | A1 | * | 3/2003 | Kanda et al. ................. 370/328 |
| 2003/0133457 | A1 | * | 7/2003 | Ono et al. ................... 370/395.4 |
| 2004/0058678 | A1 | * | 3/2004 | deTorbal ...................... 455/437 |
| 2004/0077349 | A1 | * | 4/2004 | Barak et al. .................. 455/436 |
| 2004/0203769 | A1 | * | 10/2004 | Sakanaba .................... 455/435.1 |
| 2004/0203787 | A1 | * | 10/2004 | Naghian ...................... 455/437 |
| 2005/0030924 | A1 | * | 2/2005 | Yano et al. ................... 370/332 |
| 2006/0073849 | A1 | | 4/2006 | Kuriki et al. |

(Continued)

FOREIGN PATENT DOCUMENTS

| JP | 11-046380 | 2/1999 |
| JP | 11-234736 | 8/1999 |

(Continued)

*Primary Examiner* — Joseph Arevalo
(74) *Attorney, Agent, or Firm* — Smith, Gambrell & Russell, LLP

(57) ABSTRACT

The present invention relates to a device that includes a radio network control device operable to control a plurality of radio base stations. Also included is a grouping processing unit operable to group into a same group many mobile devices that perform handover to a specific radio base station in a predetermined period. Furthermore, the device includes an identification information notifying unit operable to, when a mobile device performs handover to the radio base station, notify the radio base station of identification information of the mobile device and identification information of one or more other mobile devices belonging to the same group.

7 Claims, 17 Drawing Sheets

U.S. PATENT DOCUMENTS

| | | | |
|---|---|---|---|
| 2006/0148485 A1* | 7/2006 | Kangas et al. | 455/453 |
| 2006/0165037 A1* | 7/2006 | Jung et al. | 370/331 |
| 2006/0205398 A1* | 9/2006 | Seckendorf et al. | 455/423 |
| 2007/0147299 A1* | 6/2007 | Ando et al. | 370/331 |
| 2008/0009291 A1* | 1/2008 | Emberson et al. | 455/437 |
| 2008/0049674 A1* | 2/2008 | Cha et al. | 370/331 |
| 2008/0080462 A1* | 4/2008 | Kundu et al. | 370/342 |
| 2008/0107082 A1* | 5/2008 | Igarashi et al. | 370/331 |
| 2008/0119192 A1* | 5/2008 | Miyata | 455/438 |
| 2009/0305704 A1* | 12/2009 | Kato et al. | 455/437 |
| 2010/0097936 A1* | 4/2010 | Lee et al. | 370/241 |
| 2011/0110334 A1* | 5/2011 | Hirano et al. | 370/331 |

FOREIGN PATENT DOCUMENTS

| | | |
|---|---|---|
| JP | 2002-165272 | 6/2002 |
| JP | 20040304298 | 10/2004 |
| JP | 2006-101253 | 4/2006 |

* cited by examiner

MOBILE DEVICE HANDOVER SUPPORTING METHOD, RADIO NETWORK CONTROL DEVICE, RADIO BASE STATION AND COMPUTER PROGRAM

CROSS-REFERENCE TO RELATED APPLICATIONS

This application is related to and claims priority to Japanese patent application no. 2007-44261 filed on Feb. 23, 2007 in the Japan Patent Office, and incorporated by reference herein.

FIELD OF THE INVENTION

The present invention relates to a mobile device handover supporting method, a radio network control device, and a radio network base station in a radio communication system.

BACKGROUND OF THE INVENTION

In recent years the use of mobile devices for wireless communication has become widespread. The rate of adoption of cellular phones, in particular, has been extremely high, and it is becoming rare to find someone who does not own one. When on the move in a vehicle such as a bus or train, mobile devices carried by passengers simultaneously handover from one radio communication base station to another radio communication base station. The number of devices involved in these simultaneous handovers is increasing with the increasing levels of adoption.

When many mobile devices simultaneously request handover to the same radio base station, a large load is temporarily placed on the base station and on higher position nodes.

According to a method disclosed in Japanese Patent Laid-Open No. H11-46380, a base station correspondent communication device is provided in each vehicle. When n mobile stations inside the vehicle output position registration requests, the base station correspondent communication device executes the position registration operation as a representative for all n mobile stations. With this arrangement, the number of position registrations is reduced by a factor of 1/n.

According to another method disclosed in Japanese Patent Laid-Open No. 2002-165272, communication terminals form groups through independent communication with one another. By having one communication terminal act as a representative for a plurality of communication terminals, which reduces the number of communication terminals effectively managed through a communication control device, the amount of processing required in the communication system is reduced. Each communication terminal includes a communication unit for transmitting and receiving information to and from other communication terminals without going through the communication control device. When predefined conditions on results of this transmission and reception are met, the communication terminals alter connection information, which allows communications and is stored in a service control device, via the connected communication control device.

SUMMARY OF THE INVENTION

According to one embodiment, the present invention comprises a device that includes a radio network control device that is operable to control a plurality of radio base stations. In addition, the device includes a grouping processing unit that is operable to group into a same group many mobile devices which perform handover to a specific radio base station in a predetermined period. Also included is an identification information notifying unit operable to, when a mobile device performs handover to the radio base station, notify the radio base station of identification information of the mobile device and identification information of one or more other mobile devices belonging to the same group.

According to another embodiment, the present invention comprises a mobile device handover supporting method for a radio network. The method includes a mobile device group processing step of grouping a plurality of mobile devices that perform handover to a same radio base station in a predetermined period into a same group. Also included is an identification information notifying processing step of, when the mobile device is to perform handover to the radio base station, notifying the radio base station of identification information of the mobile device and identification information of one or more other mobile devices belonging to the same group as the mobile device.

Optionally, the method may also include a step of causing the radio base station to execute resource securing processing to secure resources for each of the mobile devices corresponding to the plurality of identification information received in the notification from a radio network control device. If desired, the method may further comprise a step of, when a portion of mobile devices belonging to the group have performed handover to the radio base station in the predetermined period and a remaining portion of mobile devices belonging to the group have not performed handover to the radio base station in the predetermined period, causing the radio network control device to execute exclusion processing to exclude either the portion of mobile devices or the remaining portion of mobile devices from the group.

During the removal processing, a portion, out of the portion of mobile devices belonging to the group and the remaining portion of mobile devices belonging the group, that includes fewer mobile devices may be excluded from the group. Another step may be included that causes, when resources have been secured for the mobile devices corresponding to the plurality of identification information and one or more of the mobile devices have not performed handover by an end of the predetermined period, the radio base station to execute resource releasing processing to release resources for the one or more mobile devices which have not performed handover.

According to another aspect, the present invention comprises a radio network control device for controlling a plurality of radio base stations. The device preferably includes a mobile device group processing unit operable to group into a same group a plurality of mobile devices that perform handover to a specific radio base station among the plurality of radio base stations in a predetermined period. Also included is an identification information notifying unit operable to, when the mobile device is to perform handover to the radio base station, notify the radio base station of identification information of the mobile device and identification information of one or more other mobile devices belonging to the same group as the mobile device.

Yet another embodiment of the present invention comprises a radio base station. The radio base station comprises a resource securing unit operable to secure resources for mobile devices corresponding to a plurality of identification information received in notification from a radio network control device. In addition, the station includes a resource release processing unit operable to, when resources have been secured for the mobile devices corresponding to the plurality of identification information and one or more of the mobile devices have not performed handover by an end of a predetermined period, release the resources for the one or more mobile devices which have not performed handover.

Finally, another aspect of the present invention comprises a storage medium having recorded thereon a computer program used to allow a radio network control device to control a plurality of radio base stations. The computer program causes the radio network control device to execute: (i) mobile device group processing to group into a same group a plurality of mobile devices that perform handover to a specific radio base station among the plurality of radio base stations in a predetermined period; and (ii) identification information notifying processing to, when the mobile device is to perform handover to the radio base station, notify the radio base station of identification information of the mobile device and identification information of one or more other mobile devices belonging to the same group as the mobile device.

DETAILED DESCRIPTION OF THE PREFERRED EMBODIMENTS

According to one aspect of the present invention, a mobile device handover supporting method causes a radio network control device to execute grouping processing to group a plurality of mobile devices that perform handover to a same radio base station in a predetermined period into a single group. The method further executes processing, when a mobile device is performing handover to a radio base station, to notify the radio base station of identification information of the mobile device and identification information of one or more other mobile devices in the same group as the mobile device Furthermore, the mobile device handover supporting method preferably causes the radio base station to execute resource securing processing to secure resources for each of the mobile devices corresponding to the plurality of identification information in the notification from the radio network control device.

Additionally, the mobile device handover supporting method may, when a portion of the mobile devices belonging to a group have handed over to the radio base station in the predetermined period and a remaining portion of the mobile devices belonging to the group have not handed over to the radio base station in the predetermined period, cause the radio network control device to execute exclusion processing to exclude either the portion of mobile devices or the remaining portion of mobile devices from the group.

In the removal processing, a portion, out of the first portion and the remaining portion of the group, which includes fewer mobile device may be excluded from the group.

Furthermore, the mobile device handover supporting method may, when resources have been secured for the mobile devices corresponding to the plurality of identification information received in a notification from the radio network control device and one or more of the mobile devices have not performed handover by an end of the predetermined period, cause the radio base station to execute resource releasing processing to release the resources for the one or more mobile devices which have not performed handover.

Figure 1:
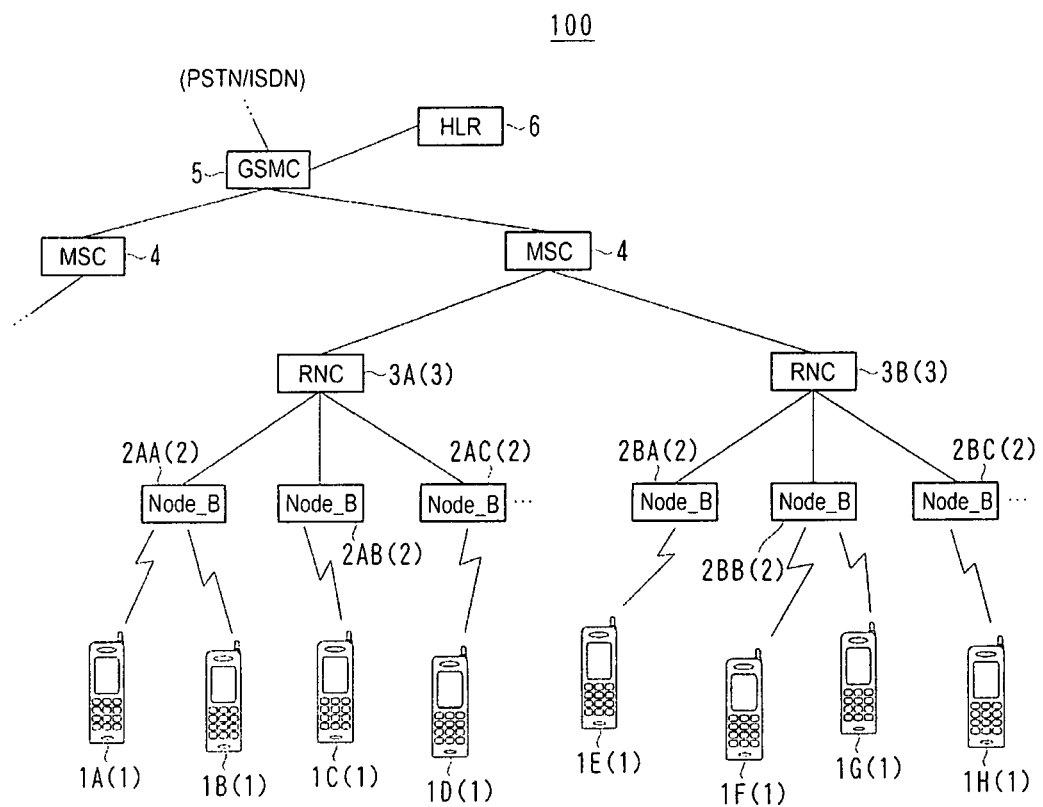
FIG. 1 is a block diagram showing one embodiment of a cellular phone system.
Figure 2:
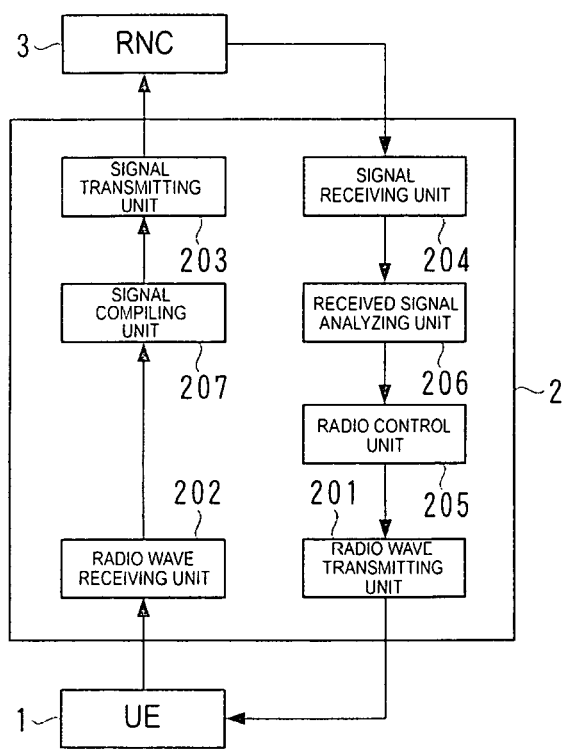
FIG. 2 is a block diagram showing one embodiment of a radio base station.
Figure 3:
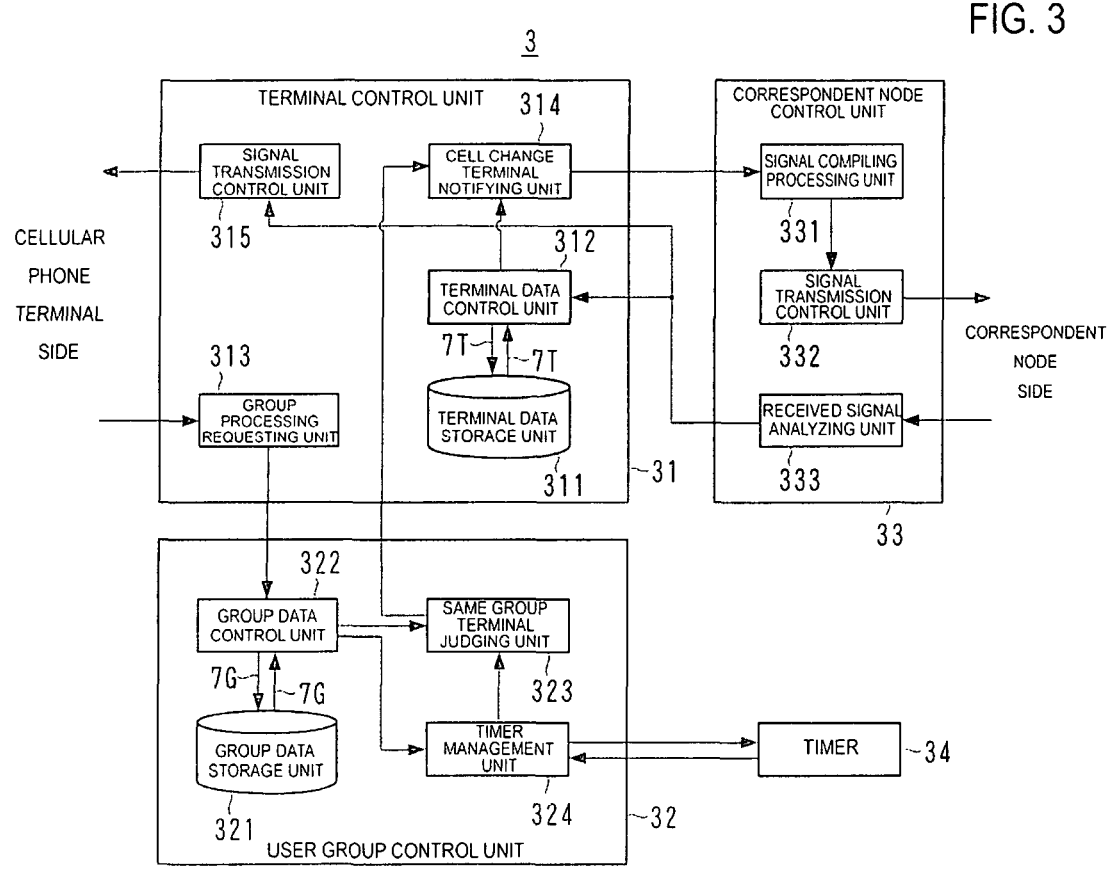
FIG. 3 is a block diagram showing one embodiment of a radio network control device.

FIG. 1 shows an example of an overall configuration of one embodiment of a cellular phone system 100, FIG. 2 shows an example configuration of one embodiment of a radio base station 2, and FIG. 3 shows an example configuration of one embodiment of a radio network control device 3.

As shown in FIG. 1, one embodiment of the cellular phone system 100 comprises a radio communication system based on a technical standard such as CDMA 2000, W-CDMA, or the like, and includes cellular phone terminals 1, radio base stations 2, a radio network control device 3, a gateway mobile switching center 4, a mobile switching center 5, a home location register 6, and the like.

The cellular phone terminals 1 are mobile stations in the cellular phone system 100, and connect and perform communication in the conventional manner with other cellular phone terminals and fixed line telephones via the radio base station 2, the radio network control device 3, and the like. The cellular phone terminal 1 may also be called a "mobile device," "UE" (User Equipment), or an "MS" (Mobile Station). Hereinafter, the cellular phone terminals 1 are referred to separately as a "cellular phone terminal 1A," a "cellular phone terminal 1B," a "cellular phone terminal 1C," and so on.

According to this embodiment, the radio base station 2 is a radio station which controls the connections of the cellular phone terminals 1, and either relays data transmitted from the cellular phone terminals 1 to a higher position device or relays data transmitted from the higher position device to the cellular phone terminals, in the same way as a conventional radio base station. The radio base station 2 may also be called a "node-B," a "BS" (Base Station), or a "BTS" (Base Transfer Station).

The radio base station 2 includes, as shown in FIG. 2, from a radio wave transmitting unit 201, a radio wave receiving unit 202, a signal transmitting unit 203, a signal receiving unit 204, a radio control unit 205, a received signal analyzing unit 206, and a signal compiling unit 207.

The radio wave transmitting unit 201, the radio wave receiving unit 202, the signal transmitting unit 203, the signal receiving unit 204, and the radio control unit 205 perform processing in the conventional manner to allow communication between the cellular phone terminals 1 and the radio network control device 3.

In other words, the radio wave transmitting unit 201 transmits control signals and the data that is to be relayed to the cellular phone terminals 1 using radio waves. The signal transmitting unit 203 transmits the control signals to the radio network control device 3. Furthermore, the signal transmitting unit 203 relays data from the cellular phone terminals 1 to the radio network control device 3.

According to one aspect, the radio wave receiving unit 202 receives the radio wave transmitted from the cellular phone terminal 1. Moreover, the signal receiving unit 204 receives control signals transmitted from the radio network control device 3. Finally, the signal receiving unit 204 further receives data to be relayed to the cellular phone terminal 1 from the radio network control device 3.

Further, the radio control unit 205 controls the radio wave transmitting unit 201 and the signal transmitting unit 203 so that control signals and data to be relayed are transmitted to the cellular phone terminals 1 or to the radio network control device terminal 3, based on control signals received by the radio wave receiving unit 202 and the signal receiving unit 204.

In addition to the above described conventional processing, the radio control unit 205 further controls the radio wave transmitting unit 201 and the signal transmitting unit 203 to allow transmission of one or more control signals relating to a group.

Note that "group" as used herein means a group made up of a plurality of cellular phone terminals 1 which move together from one cell to another in a predetermined period. Which of the cellular phone terminals 1 belong to a given group is determined by a user group control unit 32, which is described below. For example, normally the cellular phone terminals 1 of passengers in a same vehicle, e.g., train, bus, or the like, will be grouped into a single group.

The received signal analyzing unit 206 performs processing to analyze received control signals. Additionally, the signal compiling unit 207 performs processing to compile signals and data for transmission. In the present embodiment, as well as performing processing of conventional control signals, the received signal analyzing unit 206 and the signal compiling unit 207 perform processing related to control signals for a group made up of a plurality of the cellular phone terminals 1.

The processing for the group performed by the radio control unit 205, the received signal analyzing unit 206, and the signal compiling unit 207 is described below with reference to a flowchart.

Returning to FIG. 1, it can be seen that the radio network control device 3 controls the radio base stations 2, handover of the cellular phone terminals 1, and the like. The radio network control device 3 may also be called an "RNC" (Radio Network Controller), a "base station controlling device," or the like.

Besides communication modules for communication with the radio base stations 2, the gateway mobile switching center 4, and other radio network control devices, the radio network control device 3 includes hardware and software for realizing the functions of a terminal control unit 31, a user group control unit 32, a correspondent node control unit 33, and a timer 34, which are shown in FIG. 3.

The terminal control unit 31 includes from a terminal data storage unit 311, a terminal data control unit 312, a group processing requesting unit 313, a cell change terminal notifying unit 314, and a signal transmission control unit 315, and performs processing relating to control of the cellular phone terminals 1.

The terminal data storage unit 311 stores terminal data 7T for each of cellular phone terminals 1 connecting to the radio base stations 2 below the radio network control device 3. The terminal data 7T includes an identifier of the cellular phone terminal 1, an identifier of the radio base station 2 targeted for connection, and an identifier for the group to which the cellular phone terminal 1 belongs. The terminal data 7T further includes a radio control ID which is described below. Hereinafter, the identifier of the cellular phone terminal 1, the identifier of the radio base station 2, and the identifier of the group are referred to as a "terminal ID," a "cell ID," and a "group ID," respectively.

The terminal data control unit 312 performs control of the terminal data 7T. This control includes calling up the terminal data 7T stored in the terminal data storage unit 311, updating or deleting data, and causing the terminal data storage unit 311 to store the new terminal data 7T.

The group processing requesting unit 313 preferably requests the user group control unit 32 to begin the processing relating to the group. Moreover, the cell change terminal notifying unit 314 notifies the radio base station 2 that is the new connection target of the terminal ID for the cellular phone terminal 1 that is performing handover.

It is desirable for the signal transmission control unit 315 to be operable to control the communications modules so that control signals for controlling the cellular phone terminal 1 are transmitted to the cellular phone terminal 1.

The details of the processing performed by the terminal data storage unit 311 and the signal transmission control unit 315, and the associated timings, are described below with reference to a flowchart.

The user group control unit 32 includes from a group data storage unit 321, a group data control unit 322, a same group terminal judging unit 323, and a timer management unit 324, and performs control relating to the group.

The group data storage unit 321 stores group data 7G for each group. The group data 7G includes a group ID for the group, a terminal ID for each cellular phone terminal 1 belonging to the group, identification information of the timer 34 to be used, and the like. The group data 7G may further include a current management state e.g., a cell ID for the radio base station 2 targeted for connection, and the radio control ID, of the cellular phone terminals 1 belonging to the group.

The group data control unit 322 performs control of the group data 7G. This control includes calling up the group data 7G stored in the group data storage unit 321, updating or deleting data, and causing the group data storage unit 321 to store the new group data 7G.

The same group terminal judging unit 323 connects to the timer management unit 324 and the timer 34, and judges whether the cellular phone terminals 1 belong to the same group.

The timer management unit 324 then performs processing to manage the timer 34. This processing includes resetting a time indicated by the timer 34, causing the timer 34 to start timing, and detecting that the time on the timer 34 has reached a reference time (hereinafter group reference time Ta) for making judgments about members of the group.

The details of the processing performed by the group data storage unit 321 and the timer management unit 324, and the associated timing, are described below with reference to a flowchart.

The correspondent node control unit 33 includes a signal compiling processing unit 331, a signal transmission control unit 332, and a received signal analyzing unit 333, and controls the radio base station 2 which is the new connection target of the cellular phone terminal 1 or another radio network control device 3 which is positioned above the radio base station 2. Hereinafter, the radio base station 2 which is the new connection target of the cellular phone terminal 1 and the other radio network control device 3 positioned above the target radio base station are referred to as "correspondent nodes."

According to one aspect, the signal compiling processing unit 331 compiles control signals for transmission to the correspondent nodes. It is desirable for the signal transmission control unit 332 to control the communications modules so that control signals compiled by the signal compiling processing unit 331 are transmitted to the correspondent nodes.

In addition, the received signal analyzing unit 333 confirms that resources for the cellular phone terminal 1 performing handover have been captured (secured) in the correspondent node, preferably by analyzing control signals from the correspondent node. Besides the above described units, the radio base station 2 and the radio network control device 3 are provided, in the conventional manner, with resource capturing units for capturing resources to allow new management of the cellular phone terminal 1 performing handover. Furthermore, these resource capturing units request and capture resources for newly managing the plurality of cellular phone terminals 1 that belong to the group.

Hereinafter, the radio network control devices 3 are referred to separately as a "radio network control device 3A," a "radio network control device 3B," and so on. Moreover, the radio base stations 2 positioned below the radio network control device 3A are referred to separately as a "radio base station 2AA," a "radio base station 2AB," a "radio base station 2AC," and so on. The radio base stations 2 positioned below other radio network control devices 3 are referred to separately in a similar manner.

The gateway mobile switching center 4, the mobile switching station 5, and the home location register 6 are, respectively, a conventional gateway mobile switching center, a conventional mobile switching center, and a conventional home location register. These may also be called an "MSC" (Mobile Switching Center), a "GSN" (GPRS Support Node), and an "HLR" (Home Location Register), respectively.

The following describes details of the processing for the units of the radio base station 2 shown in FIG. 2 and the radio network control device 3 shown in FIG. 3 with reference to a flowchart based on a specific example.

Setting a New Group and Group Unit Handover

Figure 4:
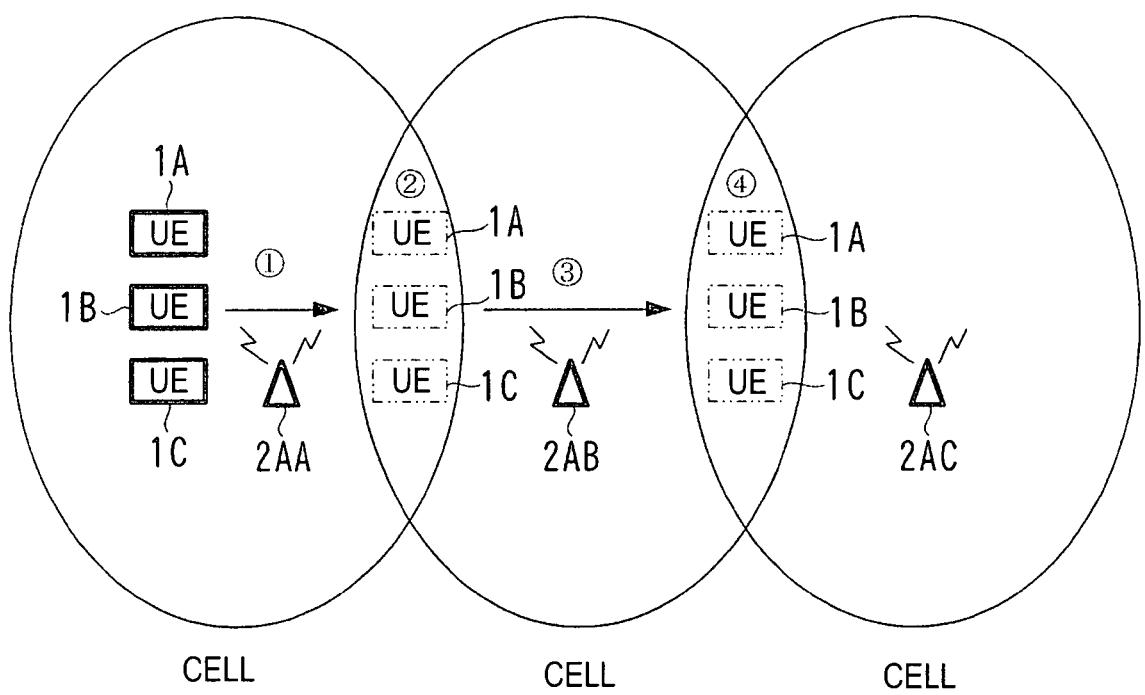
FIG. 4 is a diagram that describes an example of a moving cellular phone terminal according to one embodiment of the present invention.
Figure 5:
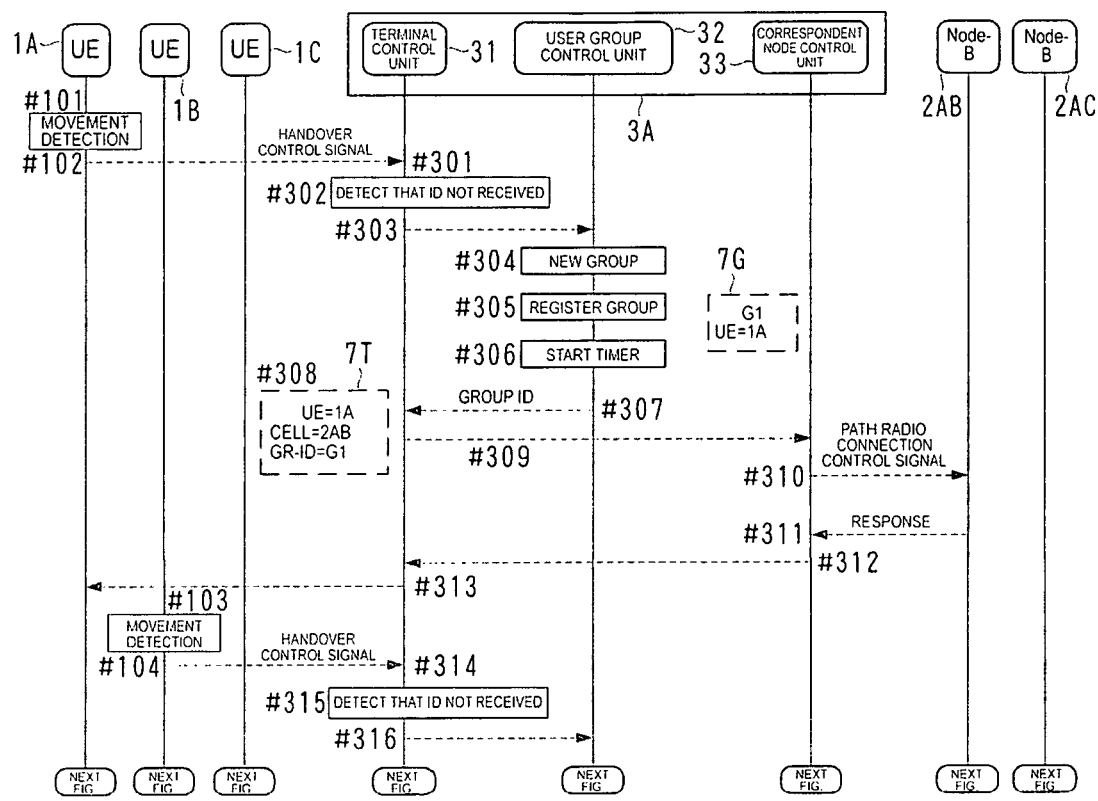
FIG. 5 is a flowchart describing an example of a processing flow for setting a new group and handover of a group unit.
Figure 8:
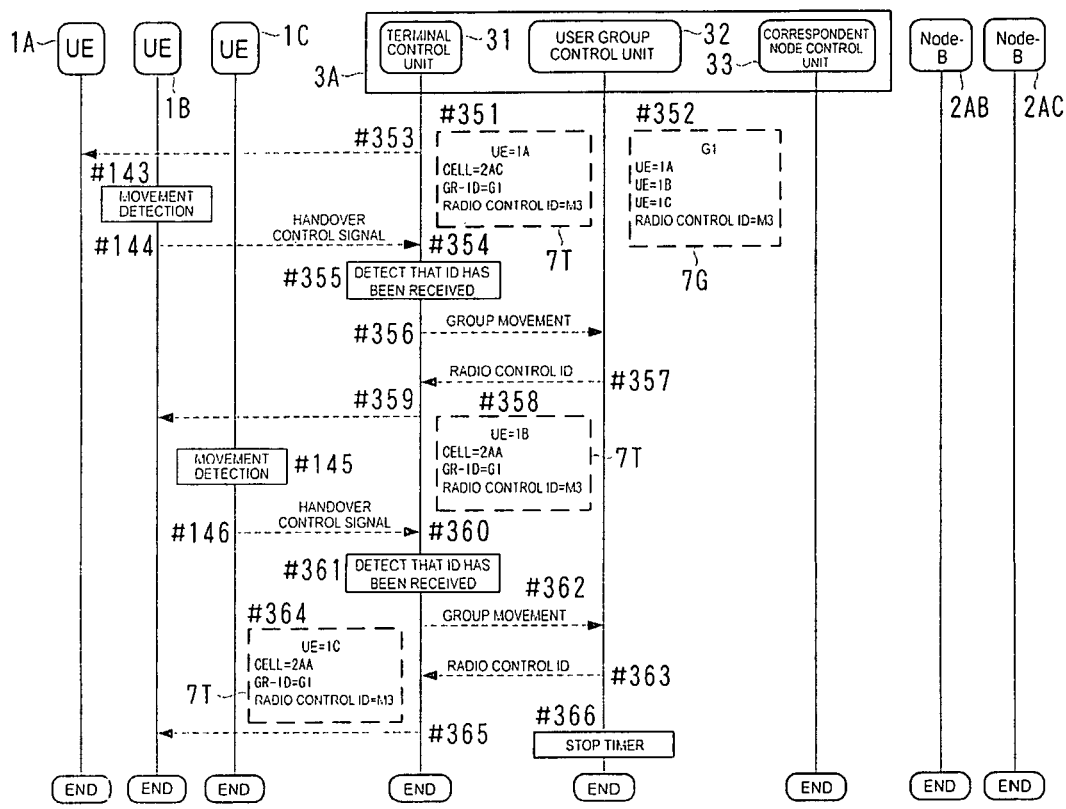
FIG. 8 is a flowchart describing an example of a processing flow for setting a new group and handover of a group unit.
Figure 9:
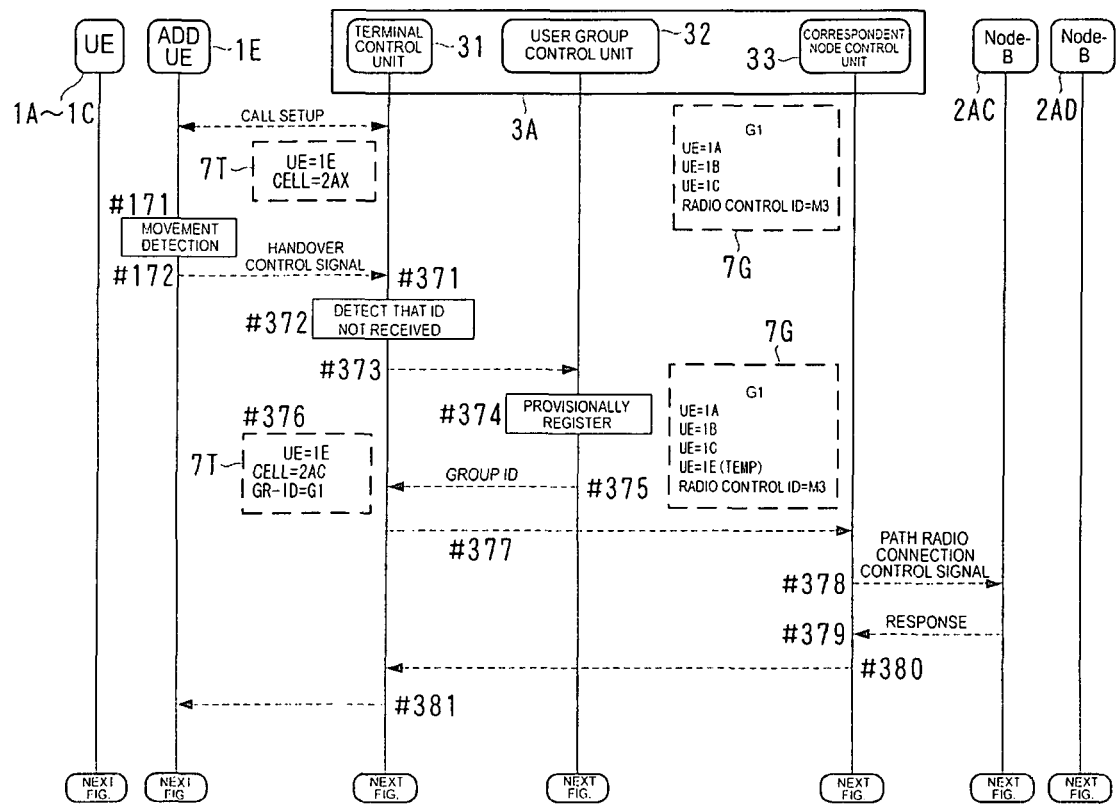
FIG. 9 is a flowchart describing an example of a processing flow for adding a cellular phone terminal to an existing group.
Figure 10:
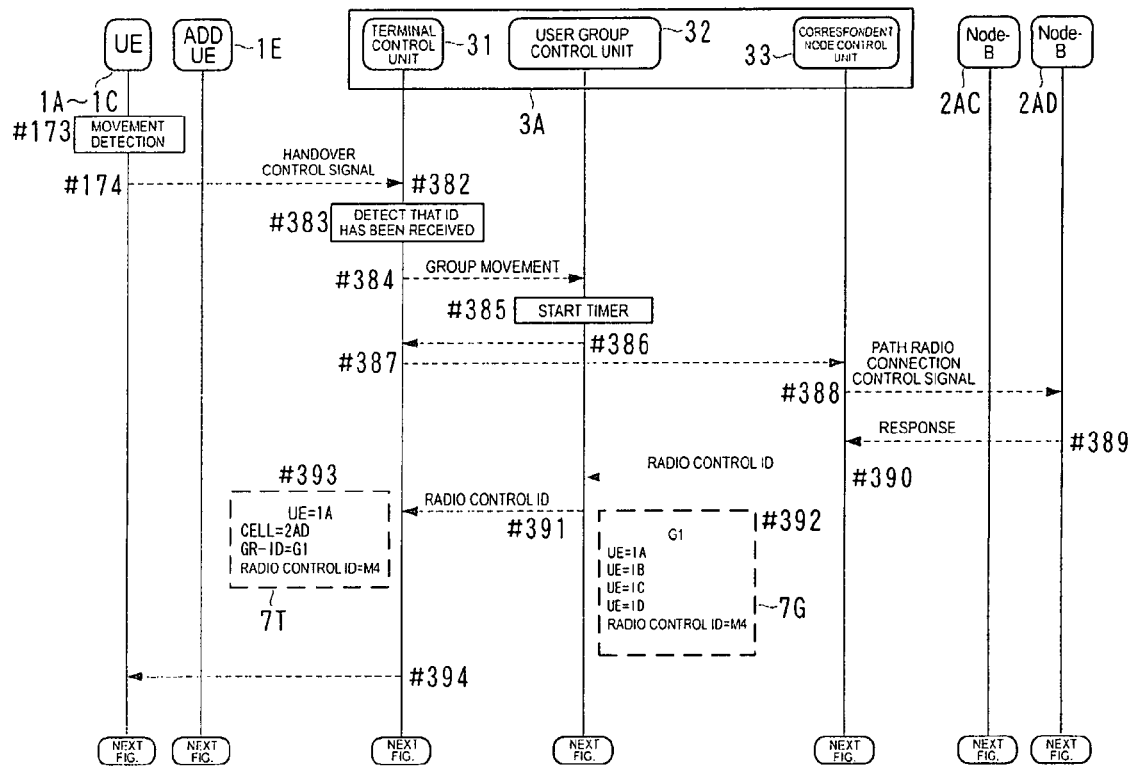
FIG. 10 is a flowchart describing an example of a processing flow for adding a cellular phone terminal to an existing group.
Figure 11:
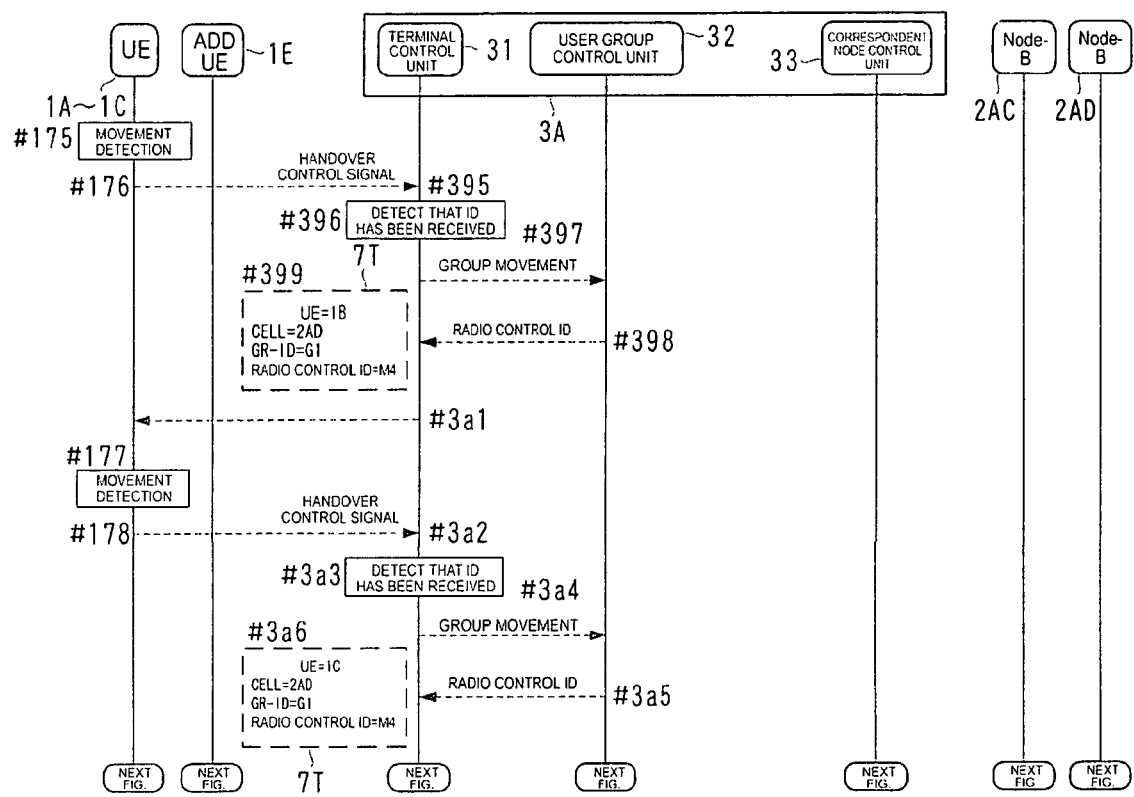
FIG. 11 is a flowchart describing an example of a processing flow for adding a cellular phone terminal to an existing group.
Figure 12:
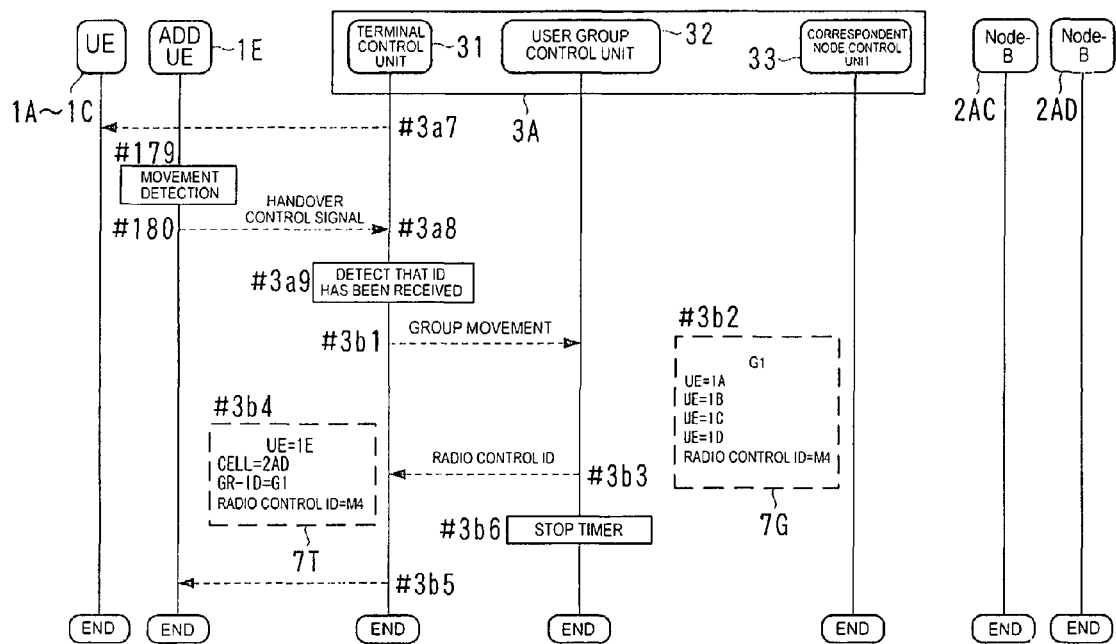
FIG. 12 is a flowchart describing an example of a processing flow for adding a cellular phone terminal to an existing group.

FIG. 4 is a diagram for describing an example of a moving cellular phone terminal 1, and FIG. 5 and FIG. 8 are flowcharts describing an example of the flow of processing for setting a new group and handing over a group unit.

It is assumed that three passengers carrying cellular phone terminals 1A, 1B, and 1C are currently riding on a bus. The current connection target for the cellular phone terminals 1A, 1B, and 1C is a radio base station 2AA, and communication is possible via the radio base station 2AA.

At this point, the radio network control device 3 above the radio base station 2AA, i.e., the radio network control device 3A, is storing the terminal data 7T for each of the cellular phone terminals 1A, 1B, and 1C in the terminal data storage unit 311 of the terminal control unit 31 (see FIG. 3).

When the bus starts moving, the cellular phone terminals 1A, 1B, and 1C all move in the same direction (see circled number "1" in FIG. 4). After a short time, the cellular phone terminals 1A, 1B, and 1C enter the cell of radio base station 2AB and reach a point of leaving the cell of the radio base station 2AA (see circled number "2" in FIG. 4).

Upon detecting this, the cellular phone terminals 1A, 1B, and 1C transmit a control signal indicating handover to the radio base station 2AB to the radio network control device 3A in the conventional manner. First, on detecting that the cellular phone terminal 1A is about to leave the cell of the radio base station 2AA and has entered the cell of the radio base station 2AB (#101 in FIG. 5), the cellular phone terminal 1A transmits a handover control signal (#102).

Upon receiving the control signal (#301), the group processing requesting unit 313 of the terminal control unit 31 in the radio network control device 3 which subordinates the radio base station 2AA (i.e., the radio network control device 3A) detects the group to which the transmission source belongs based on the terminal data 7T of the transmission source (i.e., the terminal data 7T of the cellular phone terminal 1A) (#302), and requests the user group control unit 32 to perform group processing for the transmission source (#303). At this point, the group processing requesting unit 313 notifies the user group control unit 32 of the current group of the transmission source. In this example, the group processing requesting unit 313 communicates that the transmission source is not a member of any group.

When the transmission source, which is the cellular phone terminal 1A, is not a member of any group and the timer 34 has yet to start, the group data control unit 322 and the timer management unit 324 of the user group control unit 32 perform the following processing.

The group data control unit 322 generates a new group (#304), and causes the group data storage unit 321 to store group data 7G for the new group (#305). The group data 7G includes a group ID for the group and the terminal ID for the cellular phone terminal 1A. The cellular phone terminal 1A is thereby registered as a member of the group. The timer management unit 324 resets and then starts the timer 34 (#306).

Upon the terminal control unit 31 being notified of the group ID of the generated group (#307), the terminal data control unit 312 of the terminal control unit 31 updates the terminal data 7T of the cellular phone terminal 1A to include the group ID and the cell ID of the new handover target (i.e., the radio base station 2AB newly targeted for connection) (#308).

The following exemplary processing for the handover of the cellular phone terminal 1A is performed in the conventional manner. In other words, when the cell change terminal notifying unit 314 notifies the correspondent node control unit 33 of the terminal ID of the cellular phone terminal 1A (#309), the signal compiling processing unit 331 of the correspondent node control unit 33 compiles a signal (path radio connection control signal) requesting that connection is performed with the cellular phone terminal 1A, and the signal transmission control unit 332 controls the communications modules to transmit the compiled signal to the radio base station 2AB (#310).

When resources have been secured in the radio base station 2AB for connection to the cellular phone terminal 1A and a control signal is returned (#311), the received signal analyzing unit 333 analyzes the received control signal. This thereby confirms that the cellular phone terminal 1A can handover to the radio base station 2AB, and notifies the terminal control unit 31 that handover is possible (#312).

The signal transmission control unit 315 of the terminal control unit 31 may transmit to the cellular phone terminal 1A a control signal instructing handover to the radio base station 2AB (#313). The cellular phone terminal 1A then completes the handover from the radio base station 2AA to the radio base station 2AB.

Like the cellular phone terminal 1A, on detecting that the cellular phone terminal 1B is about to leave the cell of the radio base station 2AA and has entered the cell of the radio base station 2AB (#103), the cellular phone terminal 1B transmits a handover control signal (#104).

Upon receiving the control signal (#314), the group processing requesting unit 313 of the terminal control unit 31 in the radio network control device 3A detects the group to which the transmission source currently belongs based on the terminal data 7T of the transmission source (i.e., the terminal data 7T of the cellular phone terminal 1B) in the same manner as for the cellular phone terminal 1A (#315), and requests the user group control unit 32 to perform group processing for the transmission source (#316). At this point, the detection result is communicated, and so here it is communicated that the cellular phone terminal 1B is not a member of any group.

Figure 6:
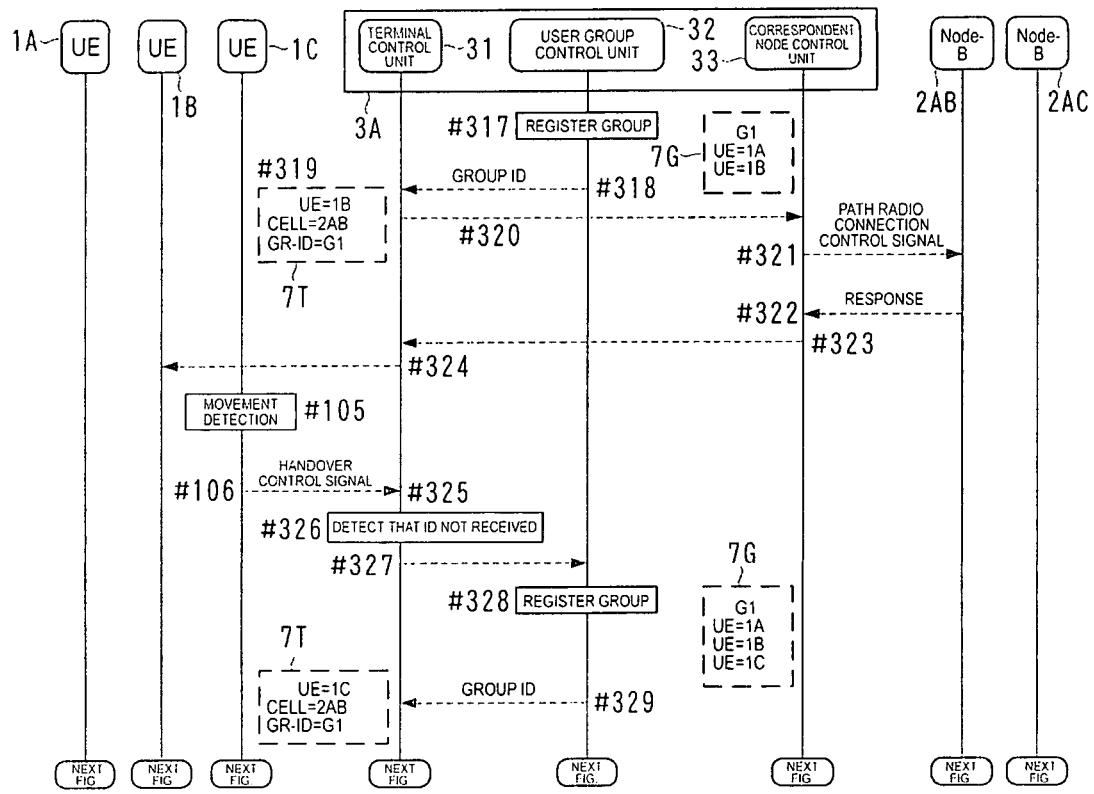
FIG. 6 is a flowchart describing an example of a processing flow for setting a new group and handover of a group unit.

In the case of the cellular phone terminal 1A (i.e., when the timer 34 was yet to start and the cellular phone terminal 1A was not a member of any group), the group data control unit 322 of the user group control unit 32 generated a new group and had the transmission source join the new group. However, when the timer 34 is timing and the transmission source (which is cellular phone terminal 1B here) is attempting to perform the same handover as the cellular phone terminal 1A, the cellular phone terminal 1B is judged to be in the same group as the cellular phone terminal 1A by the same group terminal judging unit 323. The group data control unit 322 then registers the cellular phone terminal 1B in the same group (see #317 in FIG. 6). In other words, the group data control unit 322 adds the terminal ID of the cellular phone terminal 1B to the group data 7G of the group.

When the terminal control unit 31 is notified of the group ID of the group (#318), the terminal data control unit 312 updates the terminal data 7T of the cellular phone terminal 1B, in the same manner as for the cellular phone terminal 1A, to include the cell ID of the new handover target (i.e., the radio base station 2AB newly targeted for connection) and the group ID (#319). The processing from this point onwards is also performed in the same manner as for the cellular phone terminal 1A (#320 through #324). The cellular phone terminal 1B then completes the handover from the radio base station 2AA to the radio base station 2AB.

Like the cellular phone terminal 1B, when detecting that the cellular phone terminal 1C is about to leave the cell of the radio base station 2AA and has entered the cell of the radio base station 2AB while the timer 34 is running (#105), the cellular phone terminal 1C transmits a handover control signal (#106).

Figure 7:
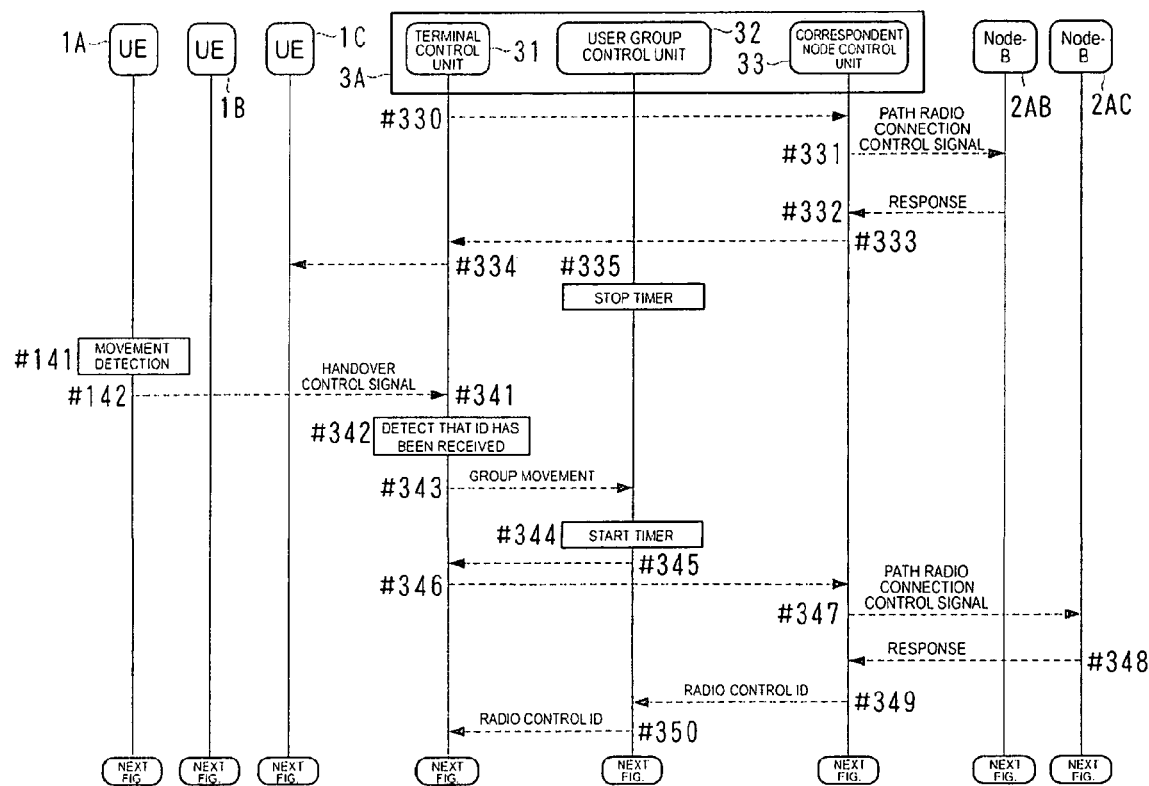
FIG. 7 is a flowchart describing an example of a processing flow for setting a new group and handover of a group unit.

The units of the radio network control device 3A and the radio base station 2AB then perform processing in the same manner as for the cellular phone terminal 1B (#325 through #334 in FIG. 7). The cellular phone terminal 1C subsequently completes the handover from the radio base station 2AA to the radio base station 2AB.

Upon detecting that the timer 34 has reached the group reference time Ta, the timer management unit 324 stops the timer 34 (#335). In other words, the cellular phone terminals 1 that perform handover from the radio base station 2AA to the radio base station 2AB in the period up to the group reference time Ta are formed into a single group.

If the bus continues to run (circled number "3" in FIG. 4), the cellular phone terminals 1A, 1B, and 1C will, after a short time, enter the cell of the radio base station 2AC and be at the point of leaving the cell of the radio base station 2AB (circled number "4" in FIG. 4).

Upon detecting this, the cellular phone terminals 1A, 1B, and 1C transmit a control signal indicating handover to the radio base station 2AC to the radio network control device 3A, in the conventional manner.

First, on detecting that the cellular phone terminal 1A is about to leave the cell of the radio base station 2AB and has entered the cell of the radio base station 2AC (#141 in FIG. 7), the cellular phone terminal 1A transmits a handover control signal (#142).

Upon receiving the control signal (#341), the group processing requesting unit 313 of the terminal control unit 31 in the radio network control device 3A detects the group to which the transmission source currently belongs based on the terminal data 7T of the transmission source (i.e., the terminal data 7T of the cellular phone terminal 1A) (#342), and requests the user group control unit 32 to perform group processing for the transmission source (#343). At this point, the group processing request unit 313 notifies the user group control unit 32 of the current group of the transmission source.

When the transmission source, which is the cellular phone terminal 1A, belongs to a group but the timer 34 has not started, the timer management unit 324 of the user group control unit 32 resets and starts the timer 34 (#344), and the group data control unit 322 calls up the group data 7G from the group data storage unit 321, and passes the group data 7G to the terminal control unit 31 (#345).

The cell change terminal notifying unit 314 then notifies the correspondent node control unit 33 of the terminal IDs in the group data 7G (here, the terminal IDs of the cellular phone terminals 1A, 1B, and 1C), which are the terminal IDs of the cellular phone terminals 1 performing the handover (#346).

In this embodiment, a signal requesting connection with the cellular phone terminals 1 having the terminal IDs from the group data 7G (path radio connection control signal) is compiled by the signal compiling processing unit 331 of the correspondent node control unit 33, and transmitted to the radio base station 2AC by the signal transmission control unit 332 (#347).

In the radio base station 2AC, the received signal analyzing unit 206 (see FIG. 2) detects that the cellular phone terminals 1 (1A, 1B, and 1C) are about to handover to the radio base station 2AC by analyzing the path radio connection control signal from the radio network control device 3A. After the resources for connection have been secured, a control signal compiled by the signal compiling unit 207 to indicate that connection is possible is returned to the radio network control device 3A by the signal transmitting unit 203 (#348).

In the radio network control device 3A, the received signal analyzing unit 333 of the correspondent node control unit 33 analyzes the control signal from the radio base station 2AC. The unit 333 thereby confirms that the cellular phone terminals 1A, 1B, and 1C can handover to the radio base station 2AC, and notifies the terminal control unit 31 and the user group control unit 32 of this fact together with the radio control IDs (#349, #350).

Additionally, the terminal data control unit 312 of the terminal control unit 31 overwrites the current cell ID in the terminal group data 7T of the cellular phone terminal 1A with the cell ID of the handover target (i.e., the radio base station 2AC), and adds the radio control ID to the terminal data 7T (#351 in FIG. 8).

Furthermore, the group data control unit 322 of the user group control unit 32 adds the radio control ID to the group data 7G of the group to which the cellular phone terminal 1A belongs (#352).

The signal transmission control unit 315 of the terminal control unit 31 may control the communication modules so as to transmit, to the cellular phone terminal 1A, a control signal instructing handover to the radio base station 2AC (#353). The cellular phone terminal 1A then completes the handover from the radio base station 2AB to the radio base station 2AC.

Like the cellular phone terminal 1A, upon detecting that the cellular phone terminal 1B is about to leave the cell of the radio base station 2AB and has entered the cell of the radio base station 2AC (#143), the cellular phone terminal 1B transmits a handover control signal (#144).

Upon receiving the control signal (#354), the group processing requesting unit 313 in the radio network control device 3A detects the group to which the transmission source (i.e., the cellular phone terminal 1B) currently belongs based on the terminal data 7T of the cellular phone terminal 1B (#355), and requests the user group control unit 32 to perform group processing for the transmission source (#356).

Upon receiving the request from the group processing requesting unit 313, if the timer 34 is running and the group data 7G of the group having the transmission source (i.e., the cellular phone terminal 1B) as a member includes the radio control ID, the group data control unit 322 of the user group control unit 32 returns the radio control ID to the terminal control unit 31 (#357).

If the radio ID is returned, the terminal data control unit 312 of the terminal control unit 31 updates the terminal data 7T of the cellular phone terminal 1B in the same manner as the terminal data 7T of the cellular phone terminal 1A. In other words, the terminal data control unit 312 overwrites the current cell ID with the cell ID of the radio base station 2AC, which is the handover target, and adds the radio control ID (#358).

In one aspect, the signal transmission control unit 315 controls the communication modules to transmit, to the cellular phone terminal 1B, a control signal instructing handover to the radio base station 2AC (#359). The cellular phone terminal 1B then completes the handover from the radio base station 2AB to the radio base station 2AC.

Like the cellular phone terminal 1B, upon detecting that the cellular phone terminal 1C is about to leave the cell of the radio base station 2AB and has entered the cell of the radio base station 2AC while the timer 34 is running (#145), the cellular phone terminal 1C transmits the handover control signal (#146).

According to this aspect of the present invention, the units of the radio network control device 3A and the radio base station 2AC then perform processing in a substantially similar manner as for the cellular phone terminal 1B (#360 through #365). The cellular phone terminal 1C then completes the handover from the radio base station 2AB to the radio base station 2AC.

Upon detecting that the timer 34 has reached the group reference time Ta, the timer management unit 324 stops the timer 34 (#366). The case in which another cellular phone terminal 1 subsequently attempts to handover to the radio base station 2AC is described below. When the group has been formed in the manner described and the plurality of cellular phone terminals 1 belonging to the group are to handover in the group reference time Ta, the group of cellular phone terminals 1 do not individually notify the radio base station 2 targeted for handover of the intention to perform handover as is conventional, but notify instead that a group of all the cellular phone terminals 1 is about to handover.

Adding Cellular Phone Terminal 1 to Existing Group

FIG. 9 through FIG. 12 are flowcharts describing examples of processing flows for adding the cellular phone terminal 1 to an existing group.

In one embodiment, it is assumed that the bus carrying the passengers in possession of the cellular phone terminals 1A, 1B, and 1C is heading towards a bus stop. The bus stop is located in the cell of the radio base station 2AC. By the time the bus reaches the bus stop, the cellular phone terminals 1A, 1B, and 1C have already been handed over to the radio base station 2AC using the procedures described above with reference to FIGS. 5 through 8.

Thereafter, when a person in possession of a cellular phone terminal 1E arrives at the bus stop to ride the bus, the cellular phone terminal 1E will also have detected entry to the cell of the radio base station 2AC (#171 in FIG. 9), and will have transmitted, to the radio network control device 3A, a control signal indicating handover to the radio base station 2AC (#172).

Upon receiving the control signal (#371), the group processing requesting unit 313 of the terminal control unit 31 in the radio network control device 3A detects, in the above-described manner, the group to which the transmission source currently belongs based on the terminal data 7T of the transmission source (i.e., the terminal data 7T of the cellular phone terminal 1E) (#372), and requests the user group control unit 32 to perform group processing for the transmission source (#373). This time, it is communicated that the cellular phone terminal 1E is not a member of any group.

When the cellular phone terminal 1E is not a member of any group and a group connecting to the radio base station 2 of that cell (i.e., radio base station 2AC) already exists, the group data control unit 322 of the user group control unit 32 provisionally registers the cellular phone terminal 1E in the existing group (#374). In other words, the group data control unit 322 adds the terminal ID of the cellular phone terminal 1E to the group data 7G of the existing group. However, the group control unit 322 preferably attaches data indicating that the registration of the cellular phone terminal 1E is provisional.

When the terminal control unit 31 is notified of the group ID of the group (#375), the terminal data control unit 312 updates the terminal data 7T of the cellular phone terminal 1E, in the manner shown in FIGS. 5 through 8, to include the cell ID of the handover target (i.e., the radio base station 2AC newly targeted for connection) and the group ID (#376). The processing from this point onwards is performed in the manner shown in FIGS. 5 through 8 (#377 through #381). The cellular phone terminal 1E then completes the handover to the radio base station 2AC.

When the person gets on the bus and the bus starts moving, the cellular phone terminals 1A, 1B, 1C, and 1E all move in the same direction. After a short time, the cellular phone terminals 1A, 1B, 1C, and 1E enter the cell of a radio base station 2AD and reach a point of leaving the cell of the radio base station 2AC. Upon detecting this, the cellular phone terminals 1A, 1B, 1C, and 1E transmit a control signal indicating handover to the radio base station 2AD to the radio network control device 3A in a conventional manner. The processing to implement handover of the cellular phone terminals 1 to the radio base station 2AD is then executed.

According to this aspect of the invention, the processing for the cellular phone terminals 1A, 1B, and 1C which are already properly grouped is performed (#173, #174, and #382 through #394 in FIG. 10, #175 through #178 and #395 through #3a6 in FIG. 11, and #3a7 in FIG. 12) using the same procedure as in the handover from the radio base station 2AB to the radio base station 2AC described above with reference to FIGS. 5 through 8.

Here too, when the group processing request for one of the cellular phone terminals 1 (cellular phone terminal 1A in this example) has been issued to the user group control unit 32 (#384), the timer 34 is reset and started (#385).

On the other hand, provided that the handover control signal for the cellular phone terminal 1E, which is provisionally registered in the group, is received by the radio network control device 3A before the timer management unit 324 detects that group reference time Ta has passed (#3a8), the handover to the radio base station 2AD is performed in the same manner as for the cellular phone terminals 1B and 1C (#3a9 through #3b5). The cellular phone terminal 1E is then formally registered as part of the group (#3b2).

Secession of Cellular Phone Terminal 1 from Existing Group

Figure 13:
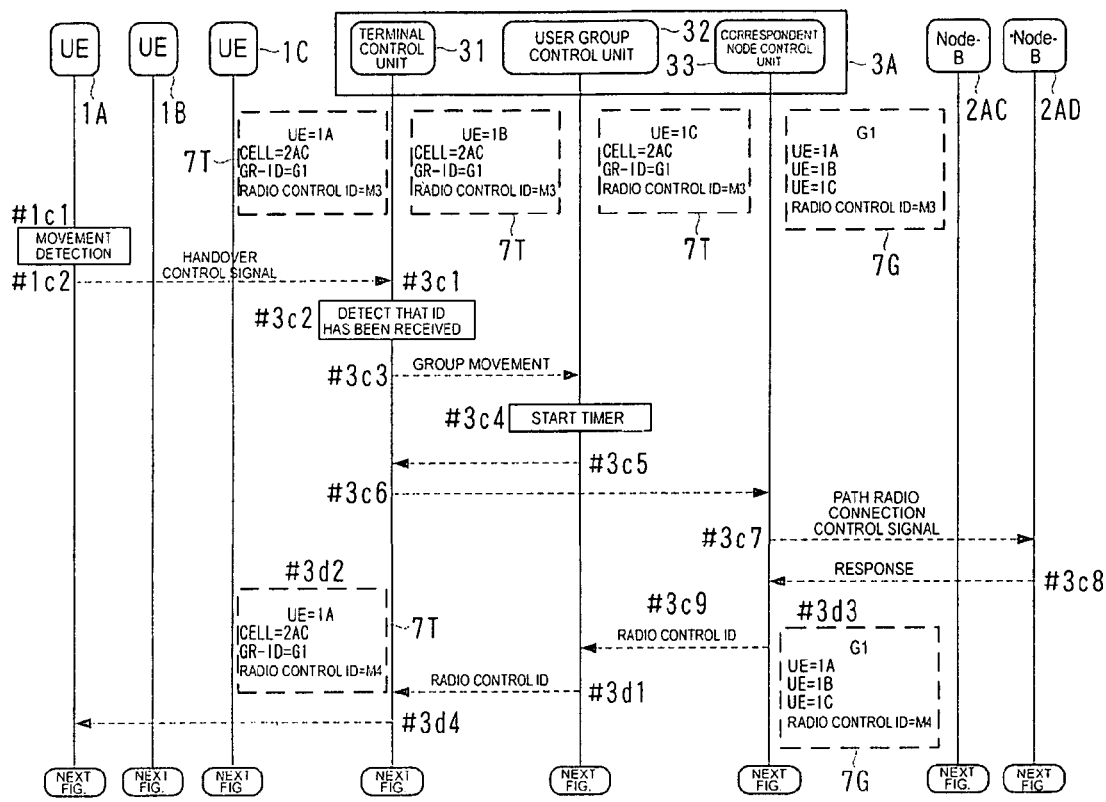
FIG. 13 is a flowchart describing an example of a processing flow for removing a cellular phone terminal from an existing group.
Figure 14:
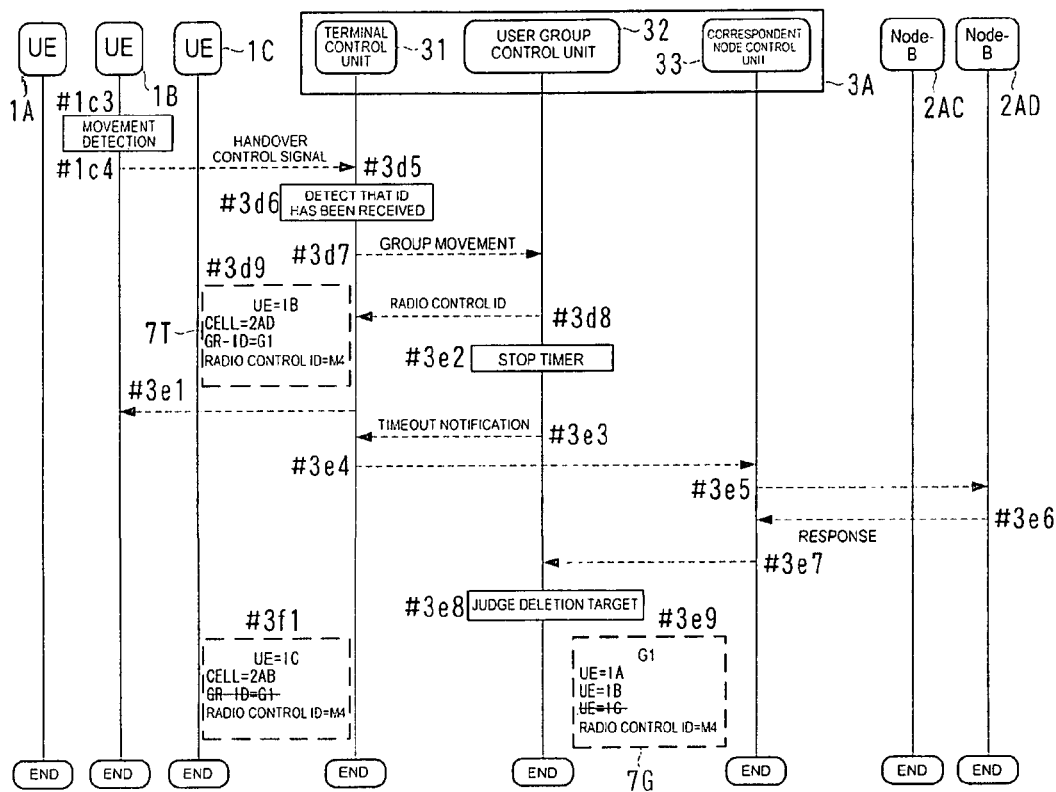
FIG. 14 is a flowchart describing an example of a processing flow for removing a cellular phone terminal to an existing group.

FIG. 13 and FIG. 14 are flowcharts describing an example of processing flows for secession of the cellular phone terminal 1 from an existing group. Moreover, FIGS. 9 through 12 describe an example of the addition of the cellular phone terminal 1E to the group made up of the cellular phone terminals 1A, 1B, and 1C. The following describes an example of the secession of one of the cellular phone terminals 1A, 1B, and 1C from the group.

According to this aspect of the invention, it is assumed that the bus stops at a given bus stop after the cellular phone terminals 1A, 1B, and 1C have been grouped using the procedure described with respect to FIGS. 5 through 8. The bus stop is located in the cell of the radio base station 2AC. In the example of FIGS. 9 through 12, the case in which a person in possession of the cellular phone terminal 1E got on the bus was described. Here, on the other hand, a case in which a passenger in possession of one of the cellular phone terminals 1A, 1B and 1C gets off the bus is described with reference to the flowcharts of FIG. 13 and FIG. 14.

By the time the bus reaches the bus stop, the cellular phone terminals 1A, 1B, and 1C have completed handover to the radio base station 2AC. Hence, the terminal data 7T of each of the cellular phone terminals 1A, 1B, and 1C includes the cell ID of the radio base station 2AC. Furthermore, the group data 7G of the group includes the terminal IDs for each of the cellular phone terminals 1A, 1B, and 1C. A short time after the passenger in possession of the cellular phone terminal 1C gets off the bus, the cellular phone terminals 1A and 1B enter the cell of the radio base station 2AD and reach the point of leaving the cell of the radio base station 2AC. Upon detecting this, the cellular phone terminals 1A and 1B transmit to the radio network control device 3A control signals indicating handover to the radio base station 2AD in the conventional manner (#1c1 and #1c2 in FIG. 13, #1c3 and #1c4 in FIG. 14).

The radio network control device 3A and the correspondent node (which is the radio base station 2AD here) perform processing to cause handover of the group of cellular phone terminals to the radio base station 2AD (#3c1 through #3e1) using the above-described processing of steps #341 through #359 in FIG. 7 and FIG. 8. Here too, when the group processing request for one of the cellular phone terminals 1 (cellular phone terminal 1A in this example) has been issued to the user group control unit 32 (#3c3), the timer 34 is reset and started (#3c4). Here, however, since only the handover control signals of the cellular phone terminals 1A and 1B are transmitted, the handover is only completed for the cellular phone terminals 1A and 1B.

The cellular phone terminal 1C, on the other hand, will not transmit a control signal indicating handover to the radio base station 2AD before the timer 34 reaches the group reference time Ta (#3e2).

When the timer 34 has reached the group reference time Ta, the terminal control unit 31 is notified (#3e3). In this embodiment, the cell change terminal notifying unit 314 of the terminal control unit 31 notifies the correspondent node control unit 33 of the terminal ID of the cellular phone terminal which has yet to transmit a handover control signal (i.e., the terminal ID of the cellular phone terminal 1C) (#3e4). The signal compiling processing unit 331 of the correspondent node control unit 33 then compiles a control signal indicating that handover of the cellular phone terminal 1C is unnecessary, and the signal transmission control unit 332 controls the communication modules so that the compiled control signal is transmitted to the radio base station 2AD (#3e5).

When resources for connecting the cellular phone terminal 1C have been released in the radio base station 2AD and a control signal is returned (#3e6), the received signal analyzing unit 333 analyzes the received signal, thereby confirms that handover to the radio base station 2AD is not to be performed for the cellular phone terminal 1C, and notifies the terminal control unit 31 of this fact (#3e7).

Figure 15:
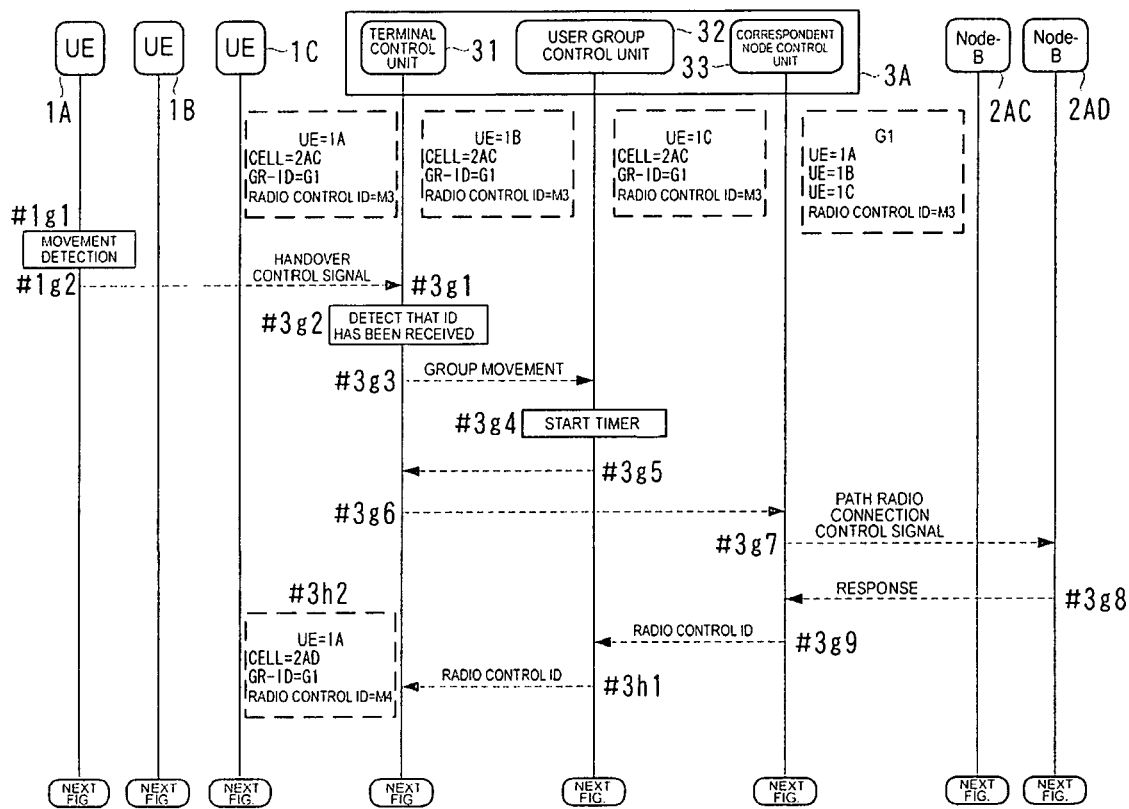
FIG. 15 is a flowchart describing an example of a processing flow for removing a cellular phone terminal to an existing group.
Figure 16:
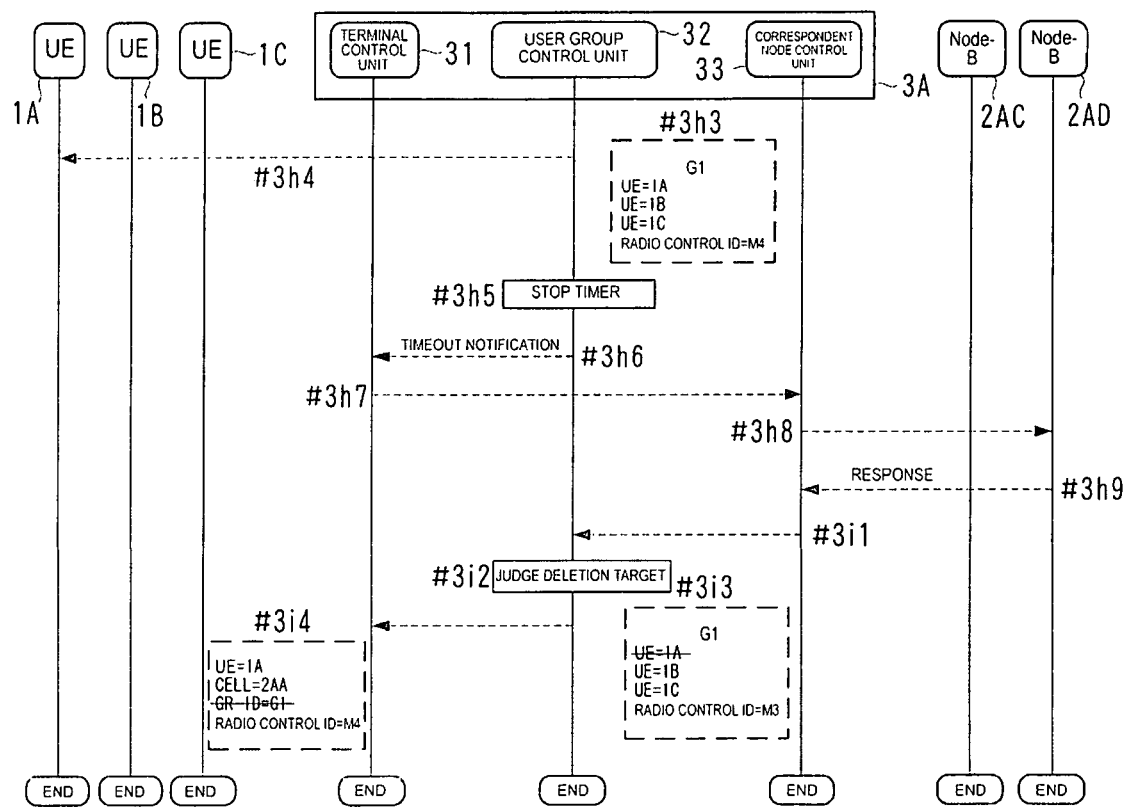
FIG. 16 is a flowchart describing an example of a processing flow for removing a cellular phone terminal to an existing group.

The same group terminal judging unit 323 of the user group control unit 32 counts the cellular phone terminals 1 of the group which have been handed over and the cellular phone terminals 1 of the group which have not been handed over and judges that the cellular phone terminals 1 of the lower of the two counts have seceded from the group (#3e8). The group data control unit 322 then deletes the terminal IDs of the seceded cellular phone terminals 1 from the group data 7G of the group (#3e9). In the present example, the terminal ID of the cellular phone terminal 1C is deleted. Furthermore, the group ID of the group is deleted from the terminal data 7T of the cellular phone terminal 1C (#3f1). FIG. 15 and FIG. 16 are flowcharts describing an example of a processing flow for secession of one of the cellular phone terminals 1 from the existing group. FIG. 13 and FIG. 14 describe the situation in which the cellular phone terminals 1 of the passengers who continued to ride the bus performed handover before the cellular phone terminal 1 of the passenger who got off the bus. However, the cellular phone terminal 1 of the passenger who got off the bus may perform handover first. The following describes an exemplary procedure for managing the group when the passenger in possession of the cellular phone terminal 1A gets off the bus and the cellular phone terminal 1A performs handover before the cellular phone terminals 1B and 1C, with reference to the flowcharts of FIG. 15 and FIG. 16.

According to this embodiment, it is assumed that the bus stops at a given bus stop after the cellular phone terminals 1A, 1B, and 1C have been grouped using the procedures of FIGS. 5 through 8. The bus stop is located in the cell of the radio base station 2AC.

The handover of the cellular phone terminals 1A, 1B, and 1C to the radio base station 2AC has already been completed. Hence, the terminal data 7T of each of the cellular phone terminals 1A, 1B, and 1C includes the cell ID of the radio base station 2AC. Furthermore, the group data 7G of the group includes terminal IDs for each of the cellular phone terminals 1A, 1B, and 1C.

Upon getting off the bus, the passenger in possession of the cellular phone terminal 1A immediately gets into another vehicle and sets off in a different direction to the bus. The cellular phone terminal 1A then enters the cell of the radio base station 2AD and reaches a point of leaving the cell of the radio base station 2AC. Upon detecting this, the cellular phone terminal 1A transmits a control signal indicating handover to the radio base station 2AD to the radio network control device 3A in the conventional manner, (#1g1 and #1g2 in FIG. 15). Thereafter, processing identical, except in the lack of transmission of the handover control signal from the cellular phone terminal 1B, to the steps #3c1 through #3e1 of FIG. 13 and FIG. 14 is executed by the radio network control device 3A and the correspondent node (the radio base station 2AD here) (#3g1 through #3h4). This completes handover of the cellular phone terminal 1A. Here too, when the group processing request has been issued to the user group control unit 32 (#3g3), the timer 34 is reset and started (#3g4). However, the cellular phone terminals 1B and 1C do not transmit the control signal indicating handover to the radio base station 2AD before the timer 34 reaches the group reference time Ta (#3e2). Thus, processing is performed to release the resources secured for the cellular phone terminals 1B and 1C in the correspondent node (#3h6 through #3i1) in a similar manner to the embodiment shown in FIG. 13 and FIG. 14.

The same group terminal judging unit 323 of the user group control unit 32 counts the cellular phone terminals which have and have not performed handover, and judges the cellular phone terminals of the lower count to have seceded from the group (#3i2). The group data control unit 322 then deletes the terminal ID of the seceded cellular phone terminal 1 (which is the cellular phone terminal 1A here) from the group data 7G of the group and returns the group ID to a directly preceding state (#3i3). The terminal data control unit 312 of the terminal control unit 31 then deletes the group ID of the group from the terminal data 7T of the cellular phone terminal 1A (#3i4).

According to the present embodiment, it is possible to smoothly secure resources during simultaneous handover of a plurality of cellular phone terminals to a same radio base station 2 without providing each vehicle with a base station correspondent communication device or providing each cellular phone terminal 1 with an independent communication function for performing independent communication. Moreover, the construction for achieving these advantages can be realized by simply changing the control method conventionally used in the radio base station 2 and the radio network control device 3. Hence, it is possible to support handover of a plurality of mobile devices more easily than in conventional arrangements.

In one embodiment, the group reference time Ta may be set freely. The value for the group reference time Ta may be set differently for each radio network control device 3. For instance, the group reference times Ta of radio network control devices 3 in regions crossed by high speed vehicles such as the Japanese Bullet Train may be set to be short, while the group reference times Ta of the network control devices 3 in regions where high speeds are rarely seen, such as downtown areas, may be set to be long. Moreover, the group reference time Ta used when forming a group may be set differently to the group reference time Ta used after a group has been formed.

In the present embodiment, the radio base station 2 released resources captured (secured) for the cellular phone terminals 1 which are not to perform handover in accordance with notification from the radio network control device 3. However, the radio base station 2 may start timing when resources are captured, and release the resources for any cellular phone terminal 1 which does not perform handover within a predetermined period.

Figure 17:
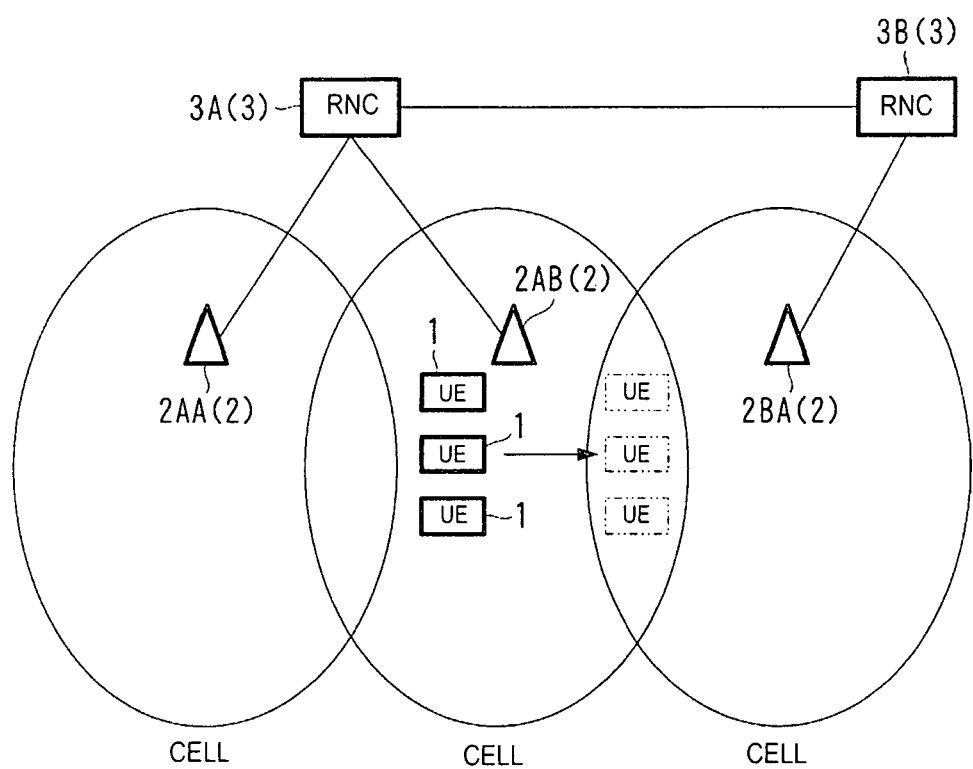
FIG. 17 is a diagram that describes an example in which a handover is performed by two radio network control devices.

FIG. 17 is a diagram for describing an example in which a handover is performed across two radio network control devices 3A and 3B. In one embodiment, an example was described in which handover took place from one radio base station 2 to another radio base station 2 under a same radio network control device 3. However, the other embodiments may also be applied in the case of handover from a radio base station 2 under one radio network control device 3 to another radio base station 2 under a different radio network control device 3.

For instance, when performing handover of three cellular phone terminals belonging to a same group from a radio base station 2AB under the radio network control device 3A to a radio base station 2BA under a radio network control device 3B as shown in FIG. 17, the radio network control device 3A selects the radio network control device 3B as the correspondent node. Then, when requesting the radio network control device 3B to capture resources for handover to the radio base station 2BA, management of the group is taken on by the radio network control device 3B. In other words, the messages requesting a radio link for the cellular phone terminals 1 are lumped together and transmitted to the radio network control device 3B.

In one embodiment, an example of a radio communication system based on a standard such as CDMA 2000 or W-CDMA was described, but other can be applied to other radio communication systems, such as wireless LANs, and PHS networks.

Moreover, embodiments where the starting and stopping of timing by the timer 34 were synchronized with the request from the group processing requesting unit 313 has been described, although other timings may be used. For instance, the starting and stopping of timing by the timer 34 may be synchronized with reception of the handover control signals from the cellular phone terminal 1. Either method is acceptable as long as the cellular phone terminals 1 that are to perform handover in the group reference time Ta can be specified.

Although the present invention has been described with reference to particular embodiments, it will be understood to those skilled in the art that the invention is capable of a variety of alternative embodiments within the spirit of the appended claims. For example, appropriate modifications can be made to the constructions of some or all of the cellular phone system 100, the radio base station 2, the radio network control device 3 and the gateway mobile switching center 4, to the processing content, to the processing order, to the make up of the terminal data 7T and group data 7G, and elsewhere. Moreover, not all disclosed aspects need to be included in any single embodiment.

What is claimed is:

1. A mobile device handover supporting method for a radio network, comprising:

determining whether a time has reached a group reference time;

providing a plurality of mobile devices with an identifier, the plurality of mobile devices performing handover from a first radio base station to a second radio base station in a predetermined period up to the group reference time;

when one of the plurality of mobile devices is to perform handover from the first radio base station to the second radio base station, notifying the second radio base station of identification information of the mobile device and identification information of one or more other mobile devices having the same identifier as the mobile device;

confirming the plurality of mobile devices can perform handover from the first radio base station to the second radio base station; and performing handover from the first radio base station to the second radio base station by the plurality of mobile devices.

2. The mobile device handover supporting method of claim 1, further comprising:

causing the radio base station to execute resource securing processing to secure resources for each of the mobile devices corresponding to the plurality of identification information received in the notification from a radio network control device.

3. The mobile device handover supporting method of claim 2, further comprising:

when a portion of mobile devices belonging to the group have performed handover to the radio base station in the predetermined period and a remaining portion of mobile devices belonging to the group have not performed handover to the radio base station in the predetermined period, causing the radio network control device to execute exclusion processing to exclude either the portion of mobile devices or the remaining portion of mobile devices from the group.

4. The mobile device handover supporting method of claim 3, wherein in the removal processing, a portion, out of the portion of mobile devices belonging to the group and the remaining portion of mobile devices belonging the group, that includes fewer mobile devices is excluded from the group.

5. The mobile device handover supporting method of claim 2, further comprising:

causing, when resources have been secured for the mobile devices corresponding to the plurality of identification information and one or more of the mobile devices have not performed handover by an end of the predetermined period, the radio base station to execute resource releasing processing to release resources for the one or more mobile devices which have not performed handover.

6. A radio network control device for controlling a plurality of radio base stations, comprising:

a memory; and a processor configured to, by executing a procedure in the memory, determine whether a time has reached a group reference time;

provide a plurality of mobile devices with an identifier, the plurality of mobile devices performing handover from a first radio base station to a second radio base station in a predetermined period up to the group reference time;

when one of the plurality of mobile devices is to perform handover from the first radio base station to the second radio base station, notify the second radio base station of identification information of the mobile device and identification information of one or more other mobile devices having the same identifier as the mobile device;

confirm the plurality of mobile devices can perform handover from the first radio base station to the second radio base station; and perform handover from the first radio base station to the second radio base station by the plurality of mobile devices.

7. A non-transitory, computer readable storage medium having recorded thereon a computer program used to allow a radio network control device to control a plurality of radio base stations, the computer program causing the radio network control device to execute:

determining whether a time has reached a group reference time;

providing a plurality of mobile devices with an identifier, the plurality of mobile devices performing handover from a first radio base station to a second radio base station in a predetermined period up to the group reference time;

when one of the plurality of mobile devices is to perform handover from the first radio base station to the second radio base station, notify the second radio base station of identification information of the mobile device and identification information of one or more other mobile devices having the same identifier as the mobile device;

confirming the plurality of mobile devices can perform handover from the first radio base station to the second radio base station; and performing handover from the first radio base station to the second radio base station by the plurality of mobile devices.

* * * * *